United States Patent Office 2,894,816
Patented July 14, 1959

2,894,816

SOLVENT EXTRACTION OF RUTHENIUM

Herbert H. Hyman, Chicago, Ill., and Gordon R. Leader, Lexington, Ky., assignors to the United States of America as represented by the United States Atomic Energy Commission No Drawing. Application September 27, 1950
Serial No. 187,148

9 Claims. (Cl. 23—101)

This invention deals with the separation of ruthenium values from aqueous solutions by solvent extraction.

In many cases, ruthenium is obtained in aqueous solutions and has to be separated therefrom. This is, for instance, true in the recovery of ruthenium from ore solutions. Ruthenium-containing solutions are also obtained in the processing of neutron-irradiated uranium which contains plutonium values and fission product values including ruthenium values. Some separation processes in use are based on selective extraction by means of water-immiscible solvents. The fission product values generally remain in the final aqueous solution after plutonium and uranium have been separated, e.g., extracted by an organic solvent. These final aqueous solutions contain ruthenium the recovery of which is often desirable prior to disposal of the fission product solution as waste.

It is an object of this invention to provide a process for the separation of ruthenium values from aqueous solutions by solvent extraction by which an increased extraction of the ruthenium values into the solvent is obtained.

This and other objects are accomplished by carrying out the extraction of ruthenium with an organic solvent in the presence of nitrite anions. It was found that in the presence of nitrite anions the distribution ratio (organic/aqueous) of ruthenium is considerably increased, a phenomenon which is probably due to the formation of a ruthenium-nitrite complex. The nitrite salt may be added to the aqueous solution from which the ruthenium is to be extracted either before or during contact with the extracting solvent. Nitrite salts, such as alkali nitrites and alkaline earth nitrites are suitable; however, alkali nitrites, such as sodium nitrite, are preferred.

While the concentration or quantity of the nitrite used is not critical, it was found advantageous to have the molar ratio of $NO_2^-$ to ruthenium greater than 1 and preferably at least 10:1.

A contacting time for the solvent with the aqueous solution of approximately fifteen minutes was found to be sufficient.

There are several types of organic compounds which are satisfactory solvents for the extraction of ruthenium in the process of this invention. These types are ethers, glycol ethers, esters, ketones, alcohols, alkyl phosphates, nitrohydrocarbons, and alkyl sulfides. A common structural property of all of these types of compounds is that they have an atom capable of donating an electron pair to a coordination bond. The extractive solvent is a liquid substantially immiscible with water and aqueous solutions. If it is a solid at room temperature, the extraction is carried out at a temperature above its melting point. The following is a list of compounds that are suitable extractants for the process of this invention:

Ethyl ether
Isopropyl ether
Butoxyethoxyethane (ethyl butyl "Cellosolve")
Diethyl ether of ethylene glycol (diethyl "Cellosolve")
Dibutyl ether of diethylene glycol (dibutyl "Carbitol")
Dibutyl ether of tetraethylene glycol
Ethyl acetate
n-Propyl acetate
Butoxyethoxyethyl acetate (butyl "Carbitol" acetate)
Methyl isobutyl ketone (hexone)
Acetophenone
Mesityl oxide
Cyclohexanone
Tert-amyl alcohol
2-ethyl-1-hexanol
Tributyl phosphate
Trioctyl phosphate
Dioctyl hydrogen phosphate
Octadecyl dihydrogen phosphate
Nitromethane
Ethyl sulfide
n-Propyl sulfide It is preferred that the organic solvent contain mineral acid, e.g., in a concentration of 0.1 to 1 N. It is preferred to use in the process an aqueous solution which contains free mineral acid, and preferably nitric acid.

In the following table the results of experiments are compiled which were carried out with aqueous ruthenium tetranitrate solutions 0.5 N in nitric acid. These solutions were shaken in each case for fifteen minutes with an equal volume of hexone.

| Nitrite to Ruthenium Molar Ratio | Ru Concn., M | Ru Distribution Ratio [1] (hexone/aqueous) |
|---|---|---|
| 1:4 | 0.0028 | ca. 0.00001 |
| 1:2 | 0.0028 | 0.0005 |
| 10:1 | 0.0023 | 0.02 |
| 100:1 | 0.00058 | 0.026 |

[1] No change in distribution ratio occurred after twenty hours of shaking.

It will be seen from these experiments that an increase of the nitrite quantity over the equimolar ratio with regard to ruthenium brings about a considerable improvement of the ruthenium extraction and that ratios of at least 10:1 yield the optimal results.

It will be understood that this invention is not to be limited to the details given herein but that it may be modified within the scope of the appended claims.

What is claimed is:

1. A process of extracting ruthenium values from an aqueous solution containing ruthenium in the form of mineral acid salt, comprising adding to said aqueous solution a nitrite selected from the group consisting of alkali nitrite and alkaline earth nitrite in an at least equimolecular quantity with regard to the quantity of ruthenium present, contacting the resulting solution with a substantially water-immiscible organic solvent, and separating an aqueous phase and a solvent phase containing ruthenium values.

2. A process for extracting ruthenium values from an aqueous soltuion containing ruthenium tetranitrate, comprising adding to said aqueous solution a nitrite selected from the group consisting of alkali nitrite and alkaline earth nitrite in an at least equimolecular quantity with regard to the quantity of ruthenium present, contacting the resulting solution with a substantially water-immiscible organic solvent, and separating an aqueous phase and a solvent phase containing ruthenium values.

3. The process of claim 2 wherein the aqueous solution contains free mineral acid.

4. The process of claim 3 wherein the mineral acid is nitric acid.

5. The process of claim 2 wherein the nitrite is added to a mixture of aqueous solution and solvent during contacting.

6. The process of claim 2 wherein the molar ratio of nitrite anion to ruthenium is at least 10:1.

7. The process of claim 2 wherein contacting is carried out for approximately fifteen minutes.

8. The process of claim 2 wherein the solvent is hexone.

9. The process of claim 8 wherein the molar ratio of nitrite anion to ruthenium is at least 10:1.

References Cited in the file of this patent

UNITED STATES PATENTS

| | | |
|---|---|---|
| 2,227,833 | Hixson et al. | Jan. 7, 1941 |
| 2,523,892 | Warf | Sept. 26, 1950 |